May 12, 1953      F. W. MUELLER      2,638,253

TEAKETTLE HAVING TOGGLE ACTING SPOUT CAP

Filed Oct. 26, 1949

INVENTOR.
FREDERICK W. MUELLER
BY
John W. Michael
ATTORNEY

Patented May 12, 1953

2,638,253

UNITED STATES PATENT OFFICE 2,638,253

TEAKETTLE HAVING TOGGLE ACTING SPOUT CAP

Frederick W. Mueller, West Bend, Wis., assignor to West Bend Aluminum Co., West Bend, Wis., a corporation of Wisconsin Application October 26, 1949, Serial No. 123,560

3 Claims. (Cl. 222—472)

This invention relates to tea kettles and particularly to singing or whistling tea kettles.

When a tea kettle spout is capped by whistling mechanism, the passage of steam through the mechanism produces a high note serving to indicate the boiling state has been reached. This has long been appreciated and many singing tea kettles are provided with separate caps which are adapted to frictionally engage the spout and may be manually removed to fill or empty the vessel. This is not entirely satisfactory since the caps may be mislaid and become so hot in use that a hot pad is frequently necessary in removing the cap. Other kettles have been provided with a permanently mounted cap actuatable by a finger grip positioned below the handle. While the latter type is highly desirable, the mechanism is relatively costly. Furthermore, since the cap is biased to the spout water can't continue boiling without the whistle operating unless the cap is manually held open.

This invention overcomes the objectionable features of the prior art devices while obtaining advantages over such devices.

An object of this invention is to provide a low cost singing tea kettle having a permanently mounted spout cap.

Another object is to provide a singing tea kettle comprising but a few readily fabricated parts.

Another object is to provide a singing tea kettle having a spout cap which is held in either its seated position or a raised position.

A further object is to provide a readily manipulated spout cap for a singing tea kettle.

Still a further object is to provide a singing tea kettle which lends itself to attractive styling.

Other objects and advantages will be pointed out in, or be apparent from, the specification and claims, as will obvious modifications of the single embodiment shown in the drawings, in which:

Figure 2:
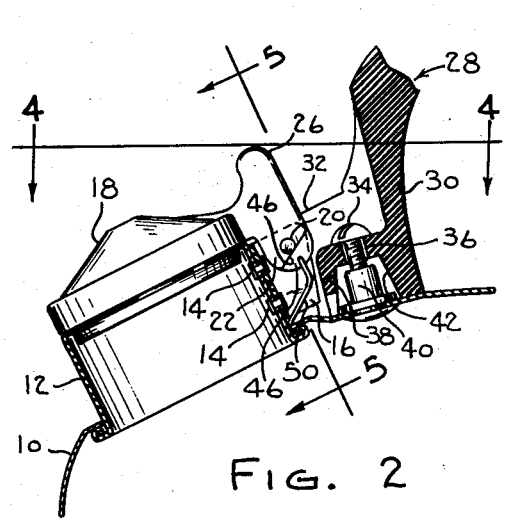
Fig. 2 is a fragmentary cross section showing the cap seated on the spout.
Figure 3:
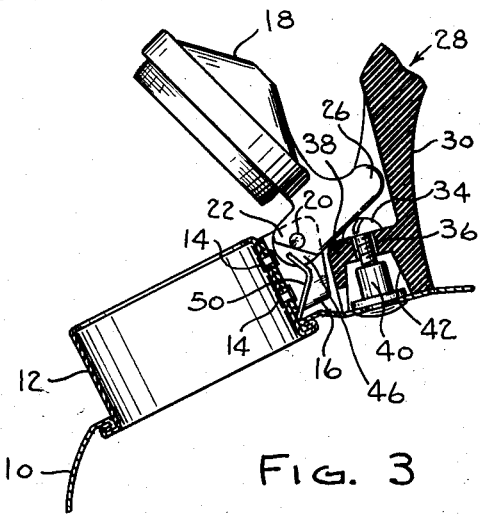
Figure 4:
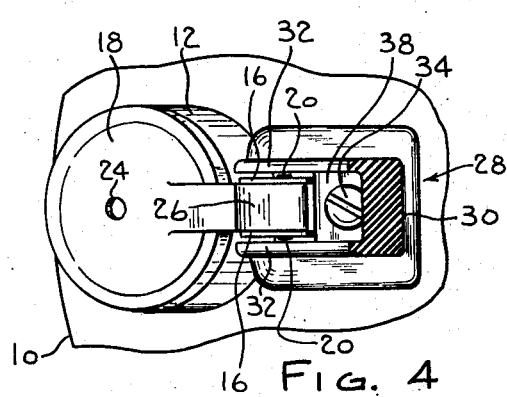
Figure 5:
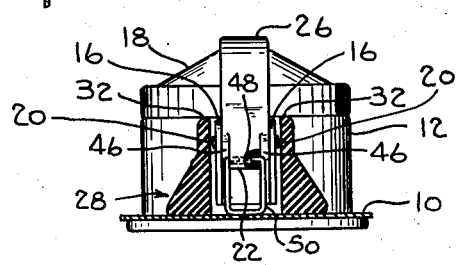

Fig. 3 is a view similar to Fig. 2 but shows the cap in its raised position; and Figs. 4 and 5 are views taken on lines 4—4 and 5—5, respectively, in Fig. 2.

The above objects and advantages are realized in the tea kettle shown in the drawings. The body 10 of the tea kettle is provided with a cylindrical spout 12 suitably crimped in a cooperating aperture. A generally U-shaped member is connected to the wall of the spout by rivets 14, 14 to provide parallel ears 16, 16 projecting inwardly generally along the diameter of the body. Plastic spout cap 18 is pivotally mounted between these ears on pins 20 projecting from the sides of the depending leg or hub 22 into cooperating holes in the ears. This pivotal mounting permits the cap to be seated on the spout as illustrated in Fig. 2 or raised as illustrated in Fig. 3. The cap contains the whistle device which responds to steam flow through the cap out of vent 24 when the cap is in its seated position (Fig. 2) and may be pivoted to a raised position (Fig. 3) by means of arm 26 projecting upwardly between the spout and handle 28 where it may be conveniently manipulated by the thumb of the hand holding the handle.

The forward leg 30 of the handle 28 is recessed to receive the arm 26 when it is moved toward the handle, as illustrated in Fig. 3. Similarly, the forward leg 30 of the handle is provided with generally parallel walls 32, 32 projecting toward the spout on either side of the pivot ears 16, 16 to conceal the pivot mounting of the cap. The side walls also conceal the head of mounting screw 34 which passes through aperture 36 in step 38 contained within the recess and threadably engages the female member 40 riveted to the body and projecting into socket 42 in step 38. The rear leg 44 of the handle 28 is connected to the body in a similar manner.

As pointed out above, the position of actuating arm 26 between the spout and the handle permits of convenient actuation by the thumb of the hand grasping the handle. The cap is pivoted from the seated position of Fig. 2 to the raised position of Fig. 3 by moving the arm 26 toward the handle. It will be noted that when the cap is in its raised position, as shown in Fig. 3, the actuating arm 26 has been received in the recessed portion of the handle while leaving space between the handle and the cap for the thumb. When it is desired to return the cap to its seated position the thumb is moved outwardly from the handle to flip the spout cap downwardly.

The manipulation of the cap is facilitated through provision of a toggle action on the pivotal movement. Thus the lower portion of the cap hub 22 is recessed on either side at 46 and provided with a through hole 48 to permit a generally U-shaped resilient clip 50 to be positioned between ears 16, 16 and within the lateral confines of the hub. The bottom of the U-shaped clip seats at the junction of the spout and the body, and the upper ends are turned into hole 48. As seen in Fig. 2, the clip 50 is bent to facilitate flexure of the member during pivotal movement of the cap. In Fig. 2 the force exerted by spring 50 is eccentric to the cap pivot to seat the cap on the spout. When the cap is raised the spring 50 passes over center and exerts a force in the opposite direction to retain the cap in its raised position.

Mounting of the spring 50 in this manner positively positions the spring and insures proper toggle action on the cap. Furthermore, engaging the ends of the spring with hole 48 in the recessed portion 46 conceals the entire spring mechanism when viewed from above, as in Fig. 4. It is to be noted that the rear face of arm 26 seats on the head of screw 34 when the cap is raised to limit and determine the raised position. It will be apparent that if a flat headed screw were utilized the limit position would be determined by contact between the arm 26 and seat 38.

Figure 1:
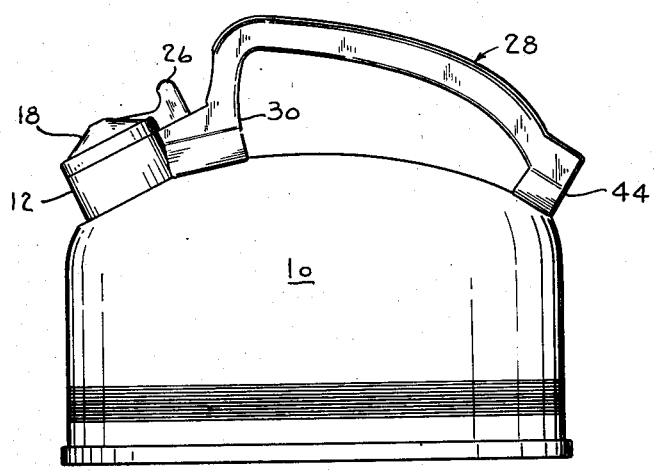
Fig. 1 is a side elevation of a tea kettle incorporating this invention.

The simplicity of the parts employed in this structure will be readily appreciated. The cap and its integral hub and arm are readily molded in a suitable plastic. Similarly the handle is a one-piece molding. The structure employed for mounting the cap and imposing the toggle action thereon is equally simple. Furthermore, the finished product may be attractively styled as shown in Fig. 1 and the operating mechanism effectively concealed.

The ease of operation is obviously desirable. The cap may be opened with a flip of the thumb in one direction and closed by moving the thumb in the other direction. When the cap is raised, the actuating arm recedes into the handle while leaving ample space for the thumb between the handle and the cap. Since a toggle action is employed, the cap may be left in a raised position to permit the water to be boiled without the annoyance of a continued whistle.

With the above description and remarks in mind it will be obvious that modifications of this structure will occur to those skilled in the art. Thus the mounting ears 16, 16 might be eliminated and a pivot pin passed through the handle walls 32, 32 and the hub 22. This, however, would sacrifice the pleasing external appearance of the handle structure. Similarly the toggle spring could be mounted in other positions but would be difficult to conceal. Therefore, while the illustrated structure is preferred, this invention is to be limited only by the scope of the claims.

I claim:

1. In a tea kettle including a body provided with a spout adjacent the periphery of the top of the body and a handle diametrically spanning the top and connected to the top adjacent the spout, a cap adapted to seat on said spout, a pair of ears connected to said spout and projecting toward said handle, a hub connected to said cap and projecting between said ears and being connected to said ears for pivotal movement, an arm connected to said cap and projecting upwardly between said spout and said handle for convenient manual actuation, said handle being recessed to receive said arm when said cap is pivoted upwardly and cooperating with said arm to limit the upward movement of the cap, and a toggle acting spring connected to said hub and bearing against the junction of said spout and said body to bias said cap either to its seat or to its raised position.

2. In a tea kettle including a body provided with a spout and a handle diametrically spanning the body and having a forward leg adjacent the spout, a cap adapted to seat on said spout, a pair of ears connected to said spout and projecting toward said leg, a hub integral with said cap and projecting between said ears, means pivotally connecting the hub to the ears, an arm integral with the cap and hub and projecting upwardly between the spout and the leg for convenient actuation by the thumb of the hand holding the handle, a toggle acting spring connected to said hub and bearing against the junction of said spout and said body to bias the cap either to its seat on the spout or to its open position, a recessed portion in said leg for receiving said arm when the cap is raised and for limiting movement of the arm and cap to leave space between the cap and leg for the thumb actuating the cap while positioning the cap to deflect steam from said handle, said cap being seated by movement of the thumb forwardly to strike the cap and throw the spring over center.

3. A tea kettle comprising, a body having a spout projecting upwardly and outwardly from the top of the body, a handle secured to the body and diametrically spanning the top, said handle including a forward leg in the proximity of the spout and projecting upwardly to a height greater than the spout so the hand grasping the handle is positioned above the spout, a cap adapted to seat on said spout, a pair of spaced apart ears connected to the spout and projecting toward said leg, a hub integral with the cap and projecting between said ears, means pivotally connecting said hub to said ears, an arm projecting upwardly from the hub between the spout and leg for convenient manual actuation by the thumb of the hand grasping the handle, a toggle acting spring acting on said hub to urge the cap to its seated or raised positions, a recess in said leg for receiving said arm when the cap is raised, a stop on said leg for limiting movement of the arm in the cap-raising direction and to position the cap to deflect steam from the handle while leaving space between the cap and leg for the thumb manipulating the arm, said arm being inaccessible for manipulation when positioned in said recess, said cap being closed by forward thumb movement to strike the cap and throw the spring over center.

FREDERICK W. MUELLER.

References Cited in the file of this patent

UNITED STATES PATENTS

| Number | Name | Date |
|---|---|---|
| 400,927 | Marks | Apr. 9, 1889 |
| 1,072,461 | Hollands | Sept. 9, 1913 |
| 1,123,974 | Antoine | Jan. 5, 1915 |
| 1,442,017 | Watry | Jan. 9, 1923 |
| 1,985,587 | Storrs | Dec. 25, 1934 |